United States Patent Office 2,714,082
Patented July 26, 1955

2,714,082

NEW OXAZOLINE DERIVATIVES

William Harris Davies, Angus Marks, and George Alan Snow, Blackley, Manchester, England, assignors to Imperial Chemical Industries Limited, a corporation of Great Britain No Drawing. Application May 11, 1953, Serial No. 354,433

Claims priority, application Great Britain May 16, 1952

9 Claims. (Cl. 167—33)

This invention relates to new oxazoline derivatives and more particularly it relates to new oxazoline derivatives which are useful as pest control agents and particularly as acaricides, bactericides and fungicides.

According to the invention we provide new oxazoline derivatives of the formula

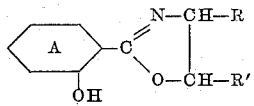

wherein R and R' stand for hydrogen or for lower alkyl radicals, and may be the same or different, and wherein the phenyl nucleus A bears as further substituent, at least one halogen atom and may optionally bear also further halogen atoms and/or lower alkyl radicals.

According to a further feature of the invention we provide a process for the manufacture of the said new oxazoline derivatives which comprises interaction of 2-hydroxybenzoic-β-hydroxyethylamides of the formula:

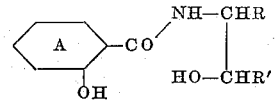

wherein A, R and R' have the meaning stated above, with dehydrating agents, for example with phosphorus pentoxide, phosphorus oxychloride, phosphorus trichloride, thionyl chloride and sulphuric acid.

The 2-hydroxybenzoic-β-hydroxyethylamides used as starting materials in this process may be obtained by reacting the appropriate methyl salicylate with an excess of the appropriate monoethanolamine according to the method described by Phillips and Baltzly (Journal of the American Chemical Society, 1947, volume 69, page 200) for 2-hydroxybenzoic-β-hydroxyethylamide itself.

The interaction of the 2-hydroxybenzoic-β-hydroxyethylamide may be brought about simply by mixing the reactants together or in a suitable solvent or diluent. Such solvent or diluent may be for example nitrobenzene, chloroform or dioxan. The reaction may be assisted or completed if necessary by the application of heat.

According to a further feature of the invention we provide another process for the manufacture of the said new oxazoline derivatives which comprises interaction of an o-hydroxybenziminoether of the formula:

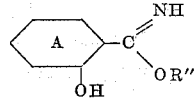

wherein A has the significance stated above and wherein R" stands for a lower alkyl radical with a β-aminoalcohol of the formula:

NH₂CHR.CHR'OH wherein R and R' have the meaning stated above, the reaction product being then if necessary heated to give the desired oxazoline.

The interaction may conveniently be carried out in aqueous or in alcoholic solution. The initial product of reaction, either spontaneously or when heated, decomposes with evolution of ammonia to give the desired oxazoline.

The o-hydroxybenziminoethers used as starting materials may be obtained from the corresponding nitriles by the known methods for the conversion of nitriles to iminoethers.

According to yet a further feature of the invention we provide another process for the manufacture of the said new oxazoline derivatives which comprises halogenation of an oxazoline derivative of the formula

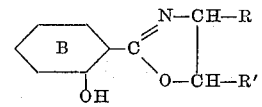

wherein R and R' have the meaning stated above and wherein the phenyl nucleus B may be further substituted by lower alkyl radicals and/or halogen atoms provided that at least one of the 3' and 5' positions of the phenyl nucleus B is unsubstituted.

The halogenation of the said oxazoline derivatives may be brought about by treatment with halogenating agents preferably in a suitable solvent medium. Suitable halogenating agents are for example the halogens.

According to yet a further feature of the invention we provide a process for the manufacture of those of the new oxazoline derivatives of the invention wherein R stands for hydrogen and R' stands for a methyl radical which comprises treating an o-hydroxybenzoic allylamide of the formula:

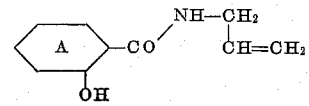

wherein A has the meaning stated above, with a concentrated mineral acid.

Again, the new compounds of the present invention are obtained, and it is yet a further feature of the invention so to manufacture them, by a process which comprises interaction of a compound of the formula

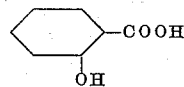

wherein A has the meaning stated above, with a compound of the formula:

NH₂—CHR—CHR'OH wherein R and R' have the meaning stated above, in the presence of a halide or oxyhalide of phosphorus or of thionyl chloride.

The new oxazoline derivatives of the invention, as said, are useful as pest control agents in that, particularly, they possess powerful acaricidal properties and also fungicidal properties. With this useful combination of properties the new oxazoline derivatives are particularly valuable in the treatment of seeds, plants, and trees particularly for the prevention and/or eradication of disease due to acarids, for example red spider, and/or due to fungi. For use as pest control agents the new oxazoline derivatives of the invention may be made up into compositions of which the new oxazoline derivatives constitute the active ingredient. These new and useful compositions are also a part of the invention. The compositions may be for example solid powders for application to seeds, crops or orchards by dusting and in order to make such compositions the new oxazoline derivatives may be mixed or ground with inert pulverulent diluents for example with talc, clay or with kieselguhr and there may also be incorporated in the said compositions, if desired, sticking or dust-binding agents. Again the compositions may be applied in the form of dispersions or suspensions in aqueous media and for such purposes the compositions may usefully be such as to be self-dispersible powders or miscible oils such as for example may be made by known expedients, for example by the incorporation in the compositions of wetting, spreading or dispersing agents. Such compositions may also usefully contain materials suitable for promoting the adhesion thereof to, for example, foliage, after spraying.

The new oxazoline derivatives of the invention are 2-(2'hydroxyphenyl)oxazolines which bear at least one halogen substituent in the 2-phenyl nucleus. We have found that of the said 2-(halogeno-2'-hydroxyphenyl)-oxazolines those in which there are at least two halogen substituents in the 2-phenyl nucleus possess the most powerful acaricidal activity. Thus we have found that 2-(3':5'-dichloro-2'-hydroxphenyl)-oxazoline combines acaricidal and fungicidal activity to a marked degree and aqueous dispersions of compositions comprising this substance as active ingredient, for example aqueous dispersions made from the dispersible powder of Example 12, hereafter, have been found to be useful in the control of plant diseases caused by fungi, for example those caused by *Alternaria solani*, *Botrytis cinerea*, *Puccinia antirrhini*, *Uromyces fabae* or *Cladosporium fulvum*. These aqueous dispersions have also been found to be useful in the control of infestation by "red spider," for example by mites of the species *Tetranychus telarius* and *Metatetranychus ulmi*.

The invention is illustrated but is not limited by the following examples in which the parts are by weight.

Example 1

4-chloro-2-hydroxybenzoic-β-hydroxyethylamide (M. P. 104–105° C., 58 parts) is added to 60 parts of stirred thionyl chloride kept below 5° C. during 30 minutes. The mixture is further stirred below 5° C. for one hour and is then allowed to warm to about 20° C. and is then stirred for a further 5 hours. It is then filtered and the solid is washed with dry ether, finely powdered, and added slowly to a solution of 30 parts of hydrated sodium acetate in 50 parts of water. The mixture is stirred for one hour and is then filtered. The solid is washed well with water and is then crystallised from ethanol. 2(4'-chloro-2'-hydroxyphenyl)oxazoline is obtained of M. P. 85–87° C.

By using, in the process of the above example, in place of 4 - chloro - 2 - hydroxybenzoic - β - hydroxyethylamide, equivalent amounts of the following substances:— 5-chloro-2-hydroxybenzoic-β-hydroxyethylamide, M. P. 88–91° C., 3:5-dichloro-2-hydroxybenzoic-β-hydroxyethylamide, M. P. 133–135° C., 3:5 - dibromo - 2 - hydroxybenzoic - β - hydroxyethylamide, M. P. 168–170° C., 3:5-diiodo-2-hydroxybenzoic-β-hydroxyethylamide, M. P. 182–184° C., 3:5-dichloro-2-hydroxybenzoic-β-hydroxypropylamide, M. P. 143–144° C., there are obtained the following products:—

2-(5'-chloro-2'-hydroxyphenyl)oxazoline, M. P. 112–133° C., 2(3':5'-dichloro-2'-hydroxyphenyl)oxazoline, M. P. 144–145° C., 2-(3':5'-dibromo-2'-hydroxyphenyl)oxazoline, M. P. 149–150° C., 2-(3':5'-diiodo-2'-hydroxyphenyl)oxazoline, M. P. 168–169° C. and 2-(3':5'-dichloro-2'-hydroxyphenyl)-5-methyloxazoline, M. P. 77–78° C.

Example 2

A solution of 58 parts of 5-chloro-2-hydroxybenzoic-β-hydroxypropylamide (M. P. 125–127° C.) in 100 parts of dioxan is added during 15 minutes to 20 parts of thionyl chloride, stirred and maintained at 0° to 5° C. The mixture is allowed to warm to 20° C. and is kept at that temperature for one hour and is then filtered. The solid hydrochloride remaining is converted into the free base in the manner described in Example 1 and 2(5'-chloro-2'-hydroxyphenyl)-5-methyloxazoline, M. P. 39–40° C., is obtained.

Example 3

10 parts of 3:5-dichloro-2-hydroxybenzoic-β-hydroxyethylamide, 150 parts of chloroform and 6 parts of phosphorus trichloride are shaken together at atmospheric temperature during 30 hours. The mixture is then filtered and the residual solid is washed with dry chloroform. It is then dissolved in 6 parts of methanol and to the solution there are added 0.5 part of aqueous ammonia ($d=0.890$). The mixture is then filtered and the solid is washed with water. It consists of 2(3':5'-dichloro-2'-hydroxyphenyl)-oxazoline, M. P. 143–144° C.

Example 4

10 parts of 3:5-dichloro-2-hydroxybenzoic-β-hydroxyethylamide are added during 30 minutes to 50 parts of phosphorus oxychloride, stirred and kept below 25° C. The mixture is further stirred at atmospheric temperature during 3 hours and is then filtered. The solid residue is washed with dry ether and this solid hydrochloride is then converted into the free base in the manner described in Example 3. There is obtained 2(3':5'-dichloro-2'-hydroxyphenyl)oxazoline, M. P. 143–144° C.

By using, in the process of the above example, in place of the 3:5-dichloro-2-hydroxybenzoic-β-hydroxyethylamide, an equivalent amount of 3:5-dichloro-2-hydroxybenzoic-β-hydroxypropylamide, M. P. 143–144° C., there is obtained 2-(3':5'-dichloro-2'-hydroxyphenyl)-5-methyloxazoline, M. P. 77–78° C.

Example 5

306 parts of phosphorus oxychloride are added during 30 minutes to a stirred mixture of 500 parts of 3:5-dichloro-2-hydroxybenzoic-β-hydroxyethylamide and 1200 parts of nitrobenzene at 25–30° C. The temperature of the mixture is then increased to 40–45° C. and so maintained during 30 minutes. Then stirring is continued at atmospheric temperature for 4 hours and 1500 parts of toluene are then added and the mixture is filtered. The solid residue is washed with toluene and it consists of a hydrochloride which is then converted into the free base in the manner described in Example 3. There is obtained 2-(3':5'-dichloro-2'-hydroxyphenyl)-oxazoline, M. P. 143–144° C.

Example 6

200 parts of 3:5-dichloro-2-hydroxybenzoic-β-hydroxyethylamide are added during 30 minutes to 366 parts of stirred concentrated sulphuric acid. The temperature of the mixture is then increased to 90–95° C., and is so maintained during one hour. The mixture is then cooled to 20° C. and added slowly to a stirred mixture of 1000 parts of ice and 1000 parts of water, the temperature being kept below 5° C. Caustic soda liquor (890–900 parts, 70° Tw.) is then added slowly to the mixture, kept below 5° C., until it is alkaline to Brilliant Yellow but not to Clayton Yellow. To the mixture there are then added 25 parts of sodium bicarbonate and the temperature is increased to 55–60° C. It is then filtered and the solid residue is washed with hot water. It is then dried at 60° C. and it consists of 2-(3':5'-dichloro-2'-hydroxyphenyl)-oxazoline, M. P. 141–142° C.

Example 7

20 parts of 3:5-dichloro-2-hydroxybenziminoethyl ether are added to a solution of 8 parts of monoethanolamine in 100 parts of water. The mixture is allowed to stand overnight and is then filtered. The solid residue is heated at 180° C. until evolution of ammonia is complete. The residue is then cooled and crystallised from methanol and there is obtained 2-(3':5'-dichloro-2'-hydroxyphenyl)-oxazoline, M. P. 141–142° C.

Example 8

8 parts of 2-(2'-hydroxyphenyl)-oxazoline and 9 parts of anhydrous sodium acetate are dissolved in 80 parts of glacial acetic acid. The solution is stirred at 20–30° C. and a solution of 16 parts of bromine in 20 parts of glacial acetic acid is added during 30 minutes. The product is then poured into 500 parts of water and the mixture is filtered. The solid residue is washed with water and consists of 2-(3':5'-dibromo-2'-hydroxyphenyl)-oxazoline, M. P. 149–150° C.

When in the process of the above example there is used in place of the 16 parts of bromine 7 parts of chlorine there is obtained 2-(3':5'-dichloro-2'-hydroxyphenyl)-oxazoline, M. P. 141–142° C.

Example 9

2 parts of 3:5-dichloro-2-hydroxybenzoic-N-allylamide are dissolved in 7 parts of concentrated sulphuric acid and the solution is heated at 60° C. during 4 hours. It is then cooled and poured onto 30 parts of ice. The mixture is filtered and the solid residue is triturated with 20 parts of 2N aqueous sodium carbonate and filtered. The solid residue consists of 2-(3':5'-dichloro-2'-hydroxyphenyl)-5-methyloxazoline, M. P. 77–78° C.

Example 10

20 parts of 3:5-dichloro-2-hydroxybenzoic acid and 6 parts of monoethanolamine are mixed and the mixture is heated at 90–95° C. for 10 minutes. It is then cooled to 60–70° C. and 15 parts of phosphorus oxychloride is added during 30 minutes. The mixture is then heated to 90–95° C. and so maintained for 15 minutes. It is then added to 250 parts of a stirred 3N aqueous solution of sodium carbonate at 70–80° C. and the mixture is maintained at this temperature during 30 minutes. It is then filtered and the residual solid is washed with water and extracted with 160 parts of boiling ethanol. The solid which separates from the ethanol extract is dried at 60° C. and consists of 2-(3':5'-dichloro-2'-hydroxyphenyl)-oxazoline, M. P. 142–143° C.

Example 11

5 parts of 3:5-dichloro-2-hydroxybenzoic-β-hydroxyethylamide are added slowly to a stirred suspension of 1 part of phosphorus pentoxide in 20 parts of boiling benzene. The mixture is heated under reflux for 4 hours and filtered. Benzene is distilled from the filtrate and the residue consists of 2-(3':5'-dichloro-2'-hydroxyphenyl)-oxazoline, M. P. 142–143° C.

Example 12

100 parts of a crude wet filter cake containing 50% of 2-(3':5'-dichloro-2'-hydroxyphenyl)-oxazoline, prepared as described in Example 6, is stirred with 50 parts of the sodium salt of a dinaphthylmethane disulphonic acid. The mixture is dried at 80° C. and ground to a fine powder which readily disperses in water. The dispersion may be used as an agricultural spray for the control of red spider and of fungus diseases.

Example 13

80 parts of 2-(3':5'-dichloro-2'-hydroxyphenyl)-oxazoline, 16 parts of the sodium salt of a dinaphthylmethane disulphonic acid, 1 part of the sodium salt of isopropylnaphthalenesulphonic acid and 300 parts of china clay are milled together to give a powder which readily disperses when added to water. Such aqueous dispersions may be used for the same purpose as are those described in Example 12.

Example 14

10 parts of 2-(3':5'-dichloro-2'-hydroxyphenyl)-oxazoline, prepared as described in Example 6, 40 parts of the sodium salt of dinaphthylmethane disulphonic acid and 5 parts of the condensation product of cetyl alcohol with 17 molecular proportions of ethylene oxide and 140 parts of water are ball-milled until the size of nearly all the solid particles in dispersion is below 5μ. The dispersion is then separated from the balls and is stirred with one part of a solution of triisopropylnaphthalenesulphonic acid in 10 parts of water. The suspension is then evaporated to dryness at 45–50° C. and the residual solid is ground to a fine powder. This powder readily disperses in water to give a dispersion of which the solid particles are nearly all below 5μ in greatest linear dimension.

Example 15

One part of 2-(3':5'-dibromo-2'-hydroxyphenyl)-oxazoline is dissolved in 80 parts of diacetone alcohol containing 2 parts of the condensation of cetyl alcohol with 17 molecular proportions of ethylene oxide. The product when poured into water gives an aqueous dispersion which may be used in the control of red spider.

What we claim is:

1. Oxazoline derivatives of the formula

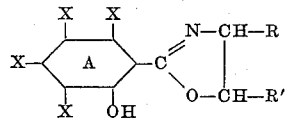

wherein R and R' stand for a member selected from the group consisting of hydrogen and lower alkyl radicals and wherein one of the X substituents on the phenyl nucleus A is a halogen atom and each of the other X substituents is selected from the group consisting of hydrogen, halogen and lower alkyl radicals.

2. 2(3':5'-dichloro-2'-hydroxyphenyl)oxazoline.

3. 2(3':5'-dibromo-2'-hydroxyphenyl)oxazoline.

4. Acaricidal and fungicidal compositions comprising, as the active acaricidal and fungicidal ingredient, one of the oxazoline derivatives of claim 1, and a diluent therefor.

5. Compositions as claimed in claim 4 which are powders self-dispersible in water.

6. Compositions as claimed in claim 4 which are oils self-miscible in water.

7. Process for the manufacture of oxazoline derivatives of the formula

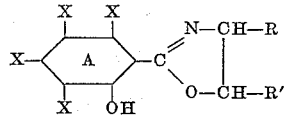

wherein R and R' stand for a member selected from the group consisting of hydrogen and lower alkyl radicals and wherein one of the X substituents on the phenyl nucleus A is a halogen atom and each of the other X substituents is selected from the group consisting of hydrogen, halogen and lower alkyl radicals, which comprises reacting a 2-hydroxybenzoic-β-hydroxyethylamide of the formula:

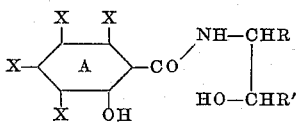

wherein A, X, R and R' have the meaning stated above, with a dehydrating agent.

8. Process as claimed in claim 7 wherein the dehydrating agent is selected from the group consisting of phosphorus pentoxide, phosphorus oxychloride, phosphorus trichloride thionyl chloride and sulphuric acid.

9. Process for the manufacture of the oxazoline derivatives of the formula

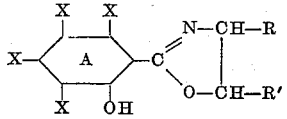

wherein R and R' stand for a member selected from the group consisting of hydrogen and lower alkyl radicals and wherein one of the X substituents on the phenyl nucleus A is a halogen atom and each of the other X substituents is selected from the group consisting of hydrogen, halogen and lower alkyl radicals, which comprises reacting a compound of the formula

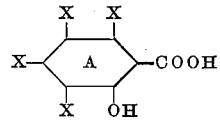

wherein A and X have the meaning stated above, with a compound of the formula $$NH_2—CHR—CHR'OH$$

wherein R and R' have the meaning stated above, in the presence of compound selected from the group consisting of phosphorus halides, phosphorus oxyhalides and thionyl chloride.

References Cited in the file of this patent

UNITED STATES PATENTS 2,112,445     Niederl _____ Mar. 29, 1938